G. R. PARANTEAU.
FRUIT TRANSFERRING DEVICE.
APPLICATION FILED MAR. 16, 1921.
1,429,092. Patented Sept. 12, 1922.
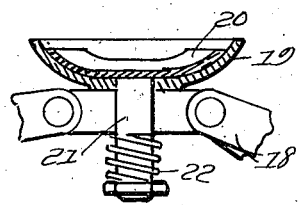
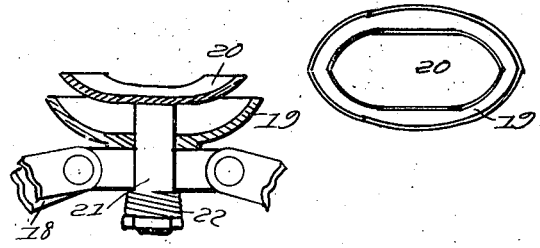
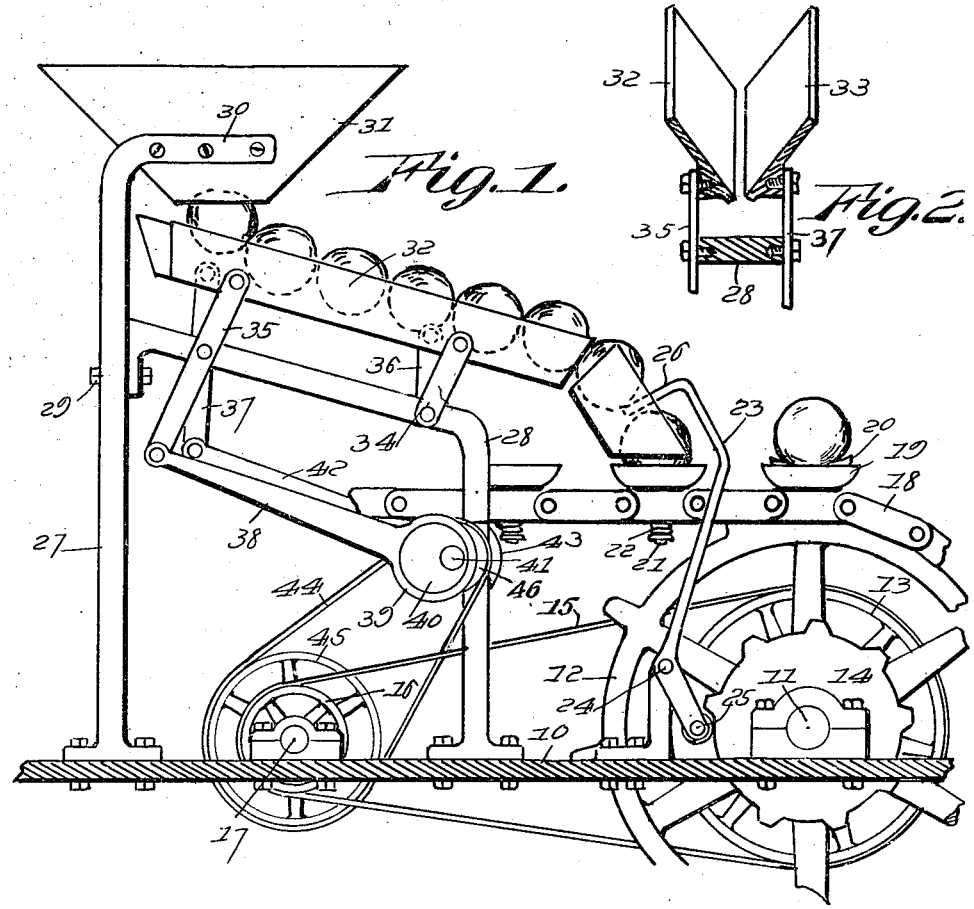
INVENTOR.
BY George R. Paranteau
Frank S. Appleman.
ATTORNEY Patented Sept. 12, 1922.

1,429,092

UNITED STATES PATENT OFFICE.

GEORGE R. PARANTEAU, OF VENTURA, CALIFORNIA.

FRUIT-TRANSFERRING DEVICE.

Application filed March 16, 1921. Serial No. 452,871.

*To all whom it may concern:*

Be it known that I, GEORGE R. PARANTEAU, a citizen of the United States of America, and resident of Ventura, in the county of Ventura and State of California, have invented certain new and useful Improvements in Fruit-Transferring Devices, of which the following is a specification.

This invention relates to fruit transferring devices and particularly to devices for use in connection with the delivery of fruit one at a time to fruit pitting machines or the like, the said invention having for its object the provision of novel means for delivering fruit to a conveyer, the fruit being so positioned on the conveyer as to be in the best position for treatment by fruit pitting machines which have provision for engaging the fruit on opposite sides of a conveyer or carrier and for presenting it to that part of the machine which results in the pitting operation.

An object of this invention is to produce novel chute sections having alternate reciprocatory movement effective to turn the fruit during its passage down the chute so the opposed symmetrical sides of the fruit will be parallel with the line of movement of the fruit carrier to which it is delivered; and the said invention furthermore has for its object the provision of novel means for effecting the reciprocation of the sides of the chute from a source of power. And the invention may furthermore include novel means for intermittently interrupting the escape of fruit from the chute and for releasing it in time to be received by successive receiving devices of a conveyer which is stationed in operative relation to the chute.

With the foregoing and other objects in view, the invention consists in the details of construction, and in the arrangement and combination of parts to be hereinafter more fully set forth and claimed.

In describing the invention in detail, reference will be had to the accompanying drawings forming part of application wherein like characters denote corresponding parts in the several views, and in which—

Figure 1 illustrates a side elevation of a machine embodying the invention;

Figure 2 illustrates a sectional view through the chute and its support with other parts of the apparatus omitted;

Figure 3 illustrates a sectional view of a delivery cup;

Figure 4 illustrates a sectional view of the same cup in a different position; and Figure 5 illustrates a plan view of a delivery cup.

In these drawings 10 denotes a base plate which supports bearings of a shaft 11, which shaft has a sprocket wheel 12, a pulley 13 and a toothed wheel 14 secured to rotate with the shaft. The pulley 13 is driven by a belt 15 which operates over a pulley 16 on the shaft 17, the said shaft 17 being driven from any suitable source of power. The sprocket wheel is engaged by a sprocket chain 18 constituting a conveyer in that it is provided with cups 19 adapted to receive fruit from the chute (to be presently described), and each cup 19 has a supplemental cup 20 which rises above the cup 19 when it reaches the sprocket wheel by reason of the engagement of the shank 21 of the cup with the periphery of the sprocket wheel, it being understood that the supplemental cup is held normally seated in the cup 19 by the spring 22. The conveyer mechanism, however, forms the subject of a companion application filed March 16, 1921, Serial Number 452,872 and further detailed description thereof in this connection is believed unnecessary. It is believed sufficient to say that the conveyer is located in such operative relation to the delivery chute as to receive fruit in the cups successively as they are brought into certain position with relation to the chute.

An escapement pawl 23 oscillates on a pivot 24 and it has one end provided with a wheel 25 struck by the successive teeth of the wheel 14 and oscillated to carry the nose 26 of the dog from under the fruit to release it, the said dog being then returned to the normal position shown in Fig. 1 under the next successive fruit to arrest it, pending the travel of the successive cup into position to receive it, at which time the dog is again actuated for a repetition of the operation.

The base plate has a frame supported on it comprising devices such as standards 27 and 28 secured together by a fastening such as 29 and the said frame structure, of course, may be modified in configuration and in the number of parts to suit particular requirements. The standard 27 is shown as having an angularly disposed end 30 to which a hopper 31 is connected and by which it is supported, the said hopper being intended to receive fruit in bulk which escapes one at a time through the bottom into the chute. The chute comprises two side members 32 and 33 arranged edgewise but having their lower edges close together as compared with the upper edges so that a flared trough or chute is formed by the said side members which are held in spaced relation to each other by separate means in order that one side member may have movement independently of the other side member. The side member 32 is supported near one end by a link 34 pivotally connected to the standard 28 and to the said side member, and it is furthermore supported at the opposite end by a lever 35 which is pivotally connected to it; the said lever being also pivotally connected to the standard 28 and it extends therebelow. The side member 33 is supported in like manner by a link 36 and a lever 37 duplicated on the opposite side of the standard 28, and a showing in full of that connection is believed unnecessary for an understanding by one skilled in the art.

The lower end of the lever 35 is pivotally connected to an arm 38 of an eccentric strap 39 which operates in conjunction with an eccentric 40 on the shaft 41, and the lever 37 is pivotally connected to an eccentric arm 42 having an eccentric strap 43 which operates in conjunction with an eccentric similar to the eccentric 40 located on the opposite end of the shaft 41. The shaft 41 is driven by a belt 44 through the medium of a pulley 45 on the shaft 17 and the said belt operates over a pulley 46 on the shaft 41, and therefore, it will be seen that the sides of the chute are reciprocated simultaneously with the movement of the conveyer and with the operation of the escapement pawl, a condition which results in gradually moving the fruit down the chute, while at the same time giving it a twisted motion which results in presenting the fruit to the best advantage to the conveyer for treatment by the elements of a fruit pitting machine, as heretofore indicated.

I claim:

1. In a fruit transferring device including a chute having sides mounted for reciprocation, means for reciprocating the said sides oppositely, and means for delivering fruit to the chute.

2. In a fruit transferring device including a chute, side members, a link pivotally connected to each side member, a standard to which the links are pivotally connected, a lever pivotally connected to each side member, pivots on which the levers are oscillatably mounted, means for oscillating the links oppositely, and means for delivering fruit to the chute.

3. In a fruit transferring device, a chute including parallel side members diverging toward their upper edges to form a trough-like structure, pivotally mounted links supporting the said side members, pivotally mounted levers connected to the said side members, and means for oscillating the levers oppositely.

4. In a fruit transferring device, a chute including parallel side members diverging toward their upper edges to form a trough-like structure, pivotally mounted links supporting the said side members, pivotally mounted levers connected to the said side members, means for oscillating the levers oppositely, and means for delivering fruit to the chute.

5. In a fruit transferring device, a chute including parallel side members diverging toward their upper edges to form a trough-like structure, pivotally mounted links supporting the said side members, pivotally mounted levers connected to the said side members, means for oscillating the levers oppositely, and means for intermittently arresting fruit at the discharge end of the chute.

6. In a fruit transferring device, a chute including parallel side members diverging toward their upper edges to form a trough-like structure, pivotally mounted links supporting the said side members, pivotally mounted levers connected to the said side members, means for oscillating the levers oppositely, means for intermittently arresting fruit at the discharge end of the chute including a pawl having an end adapted to project into the path of travel of the fruit, and means for oscillating said pawl.

7. A fruit transferring device including a chute having sides mounted for reciprocation, and means for reciprocating the said sides oppositely.

GEORGE R. PARANTEAU.